(12) United States Patent
Burns

(10) Patent No.: US 6,366,203 B1
(45) Date of Patent: Apr. 2, 2002

(54) WALK-THROUGH SECURITY DEVICE HAVING PERSONAL EFFECTS VIEW PORT AND METHODS OF OPERATING AND MANUFACTURING THE SAME

(76) Inventor: Arthur Dale Burns, 6609 Shadow Crest, Plano, TX (US) 75093

( * ) Notice: Subject to any disclaimer, the term of this patent is extended or adjusted under 35 U.S.C. 154(b) by 0 days.

(21) Appl. No.: 09/656,051

(22) Filed: Sep. 6, 2000

(51) Int. Cl.[7] .............................................. G08B 13/24
(52) U.S. Cl. ................. 340/551; 340/572.1; 340/572.9; 43/59; 342/27; 324/243; 324/244; 378/86; 109/3
(58) Field of Search ................................. 340/540, 551, 340/552, 572.9, 572.1, 568.1; 43/59, 60; 342/27, 175, 188, 192, 193, 194, 195, 196; 324/244, 226, 227, 243, 253, 260, 232; 702/150; 378/86, 87, 88; 73/864.81, 864.34; 109/3, 20, 25

(56) References Cited

U.S. PATENT DOCUMENTS

| | | | | |
|---|---|---|---|---|
| 3,697,972 A | * | 10/1972 | Brown | 43/59 |
| 3,950,696 A | * | 4/1976 | Miller et al. | 324/243 |
| 4,012,690 A | * | 3/1977 | Heytow | 324/243 |
| 4,866,424 A | * | 9/1989 | Parks | 340/551 |
| 4,906,973 A | * | 3/1990 | Karbowski et al. | 340/551 |
| 5,397,986 A | * | 3/1995 | Conway et al. | 324/243 |
| 5,689,184 A | * | 11/1997 | Jeffers et al. | 324/243 |
| 5,692,446 A | * | 12/1997 | Becker et al. | 109/3 |
| 6,037,870 A | * | 3/2000 | Alessandro | 340/572.1 |
| 6,073,499 A | * | 6/2000 | Settles | 73/864.81 |
| 6,094,472 A | * | 7/2000 | Smith | 378/86 |
| 6,133,829 A | * | 10/2000 | Johnstone et al. | 340/551 |
| 6,243,036 B1 | * | 6/2001 | Chadwick et al. | 342/27 |

\* cited by examiner

Primary Examiner—Benjamin C. Lee

(57) ABSTRACT

A walk-through security device having a personal effects view port and methods of operating and manufacturing the device. In one embodiment, the device includes: (1) a shell having an opaque sidewall with at least one material detector located therein and (2) a view port, located on the opaque sidewall, that allows a person passing through the shell to view a personal effect located on an opposite side of the sidewall.

20 Claims, 1 Drawing Sheet

US 6,366,203 B1

WALK-THROUGH SECURITY DEVICE HAVING PERSONAL EFFECTS VIEW PORT AND METHODS OF OPERATING AND MANUFACTURING THE SAME

TECHNICAL FIELD OF THE INVENTION

The present invention is directed, in general, to a walk-through security device and, more specifically, to a walk-through security device having a personal effects view port and methods of operating and manufacturing the device.

BACKGROUND OF THE INVENTION

A commentary on the troubled condition of our times is the proliferation of walk-through security devices. Threats and acts of violence have caused such devices to become pervasive. They are widely used at airports, banks, schools, and government buildings to detect guns and other weapons that could be hidden on a person and carried into such locations.

A consequence of having to use walk-through security devices to detect unwanted articles, such as a firearms, knives and other weapons, is that the rate of entry into a facility using a walk-through security device is much slower than it would be if such a device was not necessary. If a person entering a facility goes through a security device while carrying metal objects on his or her person that has a sufficient mass to cause the device's warning signal to go off, the person triggering the signal must attempt to identify and remove enough of the metallic mass he or she is carrying before going through the security device again. Depending on the sensitivity of the device it may take more than two trips for a person to go through without triggering a warning signal. In the meantime, others who want to enter the facility must wait until the person setting off the security device's signal has been cleared through.

Airport walk-through security devices can be particularly troublesome to travelers in a hurry. Knowledgeable travelers anticipate problems going through such a device by removing metallic personal effects they believe will trigger the warning signal before entering the device. The general procedure is for the person going through the device to place his or her metallic personal effects in a small tub or basket and either pass it around the device to an attendant or place them on a counter next to the device. The personal effects are retrieved after being cleared through the device. Many travelers believe that their personal effects are particularly vulnerable to theft at this time because they can not keep such effects in view.

Some of the fear of having personal effects stolen while traversing walk-through security devices is grounded in "urban lore." The general belief is that thieves target people while they are going through such devices, particularly at airports. It is generally believed that people are vulnerable at this time because of the natural confusion caused by the hustle and bustle of a large number of people in a hurry.

One scam used to steal personal effects involves a team of thieves. One member of the team will precede a targeted victim through a walk-through security device while carrying enough metal to set off the device's warning signal. In the meantime, the targeted victim will have placed his or her personal effects in the basket or tub provided or on the counter next to the security device. In the confusion caused by the first team member creating a commotion about getting cleared through the security device, a second team member picks up the victims personal effects and disappears. Variations of this scam involve a third team member to receive the purloined personal effects and remove them from the secured area as promptly as possible.

Although security experts are of the opinion that the risk of losing ones personal effects is actually higher in unmonitored public waiting areas where unwatched luggage and personal effects can disappear in an unguarded instant, the fear of losing personal effects while traversing an airport security portal is pervasive, among even the most experienced travelers. Perhaps the fear is associated with the irony of incurring a loss while undergoing a security procedure. Maybe this is one reason we all advise traveling friends and relatives to keep a watchful eye on their personal effects. Of course, the one place they cannot keep their metallic personal effects under surveillance is while going through walk-through security devices.

Therefore what is needed in the art is a mechanism or device that permits a person to visually monitor his or her personal effects while transiting walk-through security devices.

SUMMARY OF THE INVENTION

To address the above-discussed deficiencies of the prior art, the present invention provides a walk-through security device having a personal effects view port and methods of operating and manufacturing the device. In one embodiment, the device includes: (1) a shell having an opaque sidewall with at least one material detector located therein and (2) a view port, located on the opaque sidewall, that allows a person passing through the shell to view a personal effect located on an opposite side of the sidewall.

The present invention recognizes that, while security devices enhance security in some respects, they compromise security in others. While they may prevent people from carrying weapons on airplanes, they subject people to the risk of losing their personal effects. The present invention addresses this problem by allowing a person to maintain eye contact with his or her personal effects while transiting the device and enjoys substantial utility in the prevention of property crimes.

In one embodiment of the present invention, a piece of transparent material is used as the view port selected from the group consisting of (1) glass and (2) plastic. Although the viewport could be merely an opening in the sidewall of the security device, such an opening may provide an opportunity for a particularly clever person to evade the detection mechanism in the device. The use of a transparent material in the view port prevents this possibility.

Although the invention is useful with any security device, a particularly useful embodiment of present invention provides for its use in a security device that is a metal detector. In yet another embodiment of the present invention, the personal effect is elevated to a given height and the view port is located along a line of sight between the person and the personal effect. This embodiment gives some assurance to the person going through the security device that he or she will be able to monitor his or her personal effect. In still another embodiment, the personal effect is located on a conveyor belt proximate the device.

In one particularly useful embodiment, the view port is horizontally elongated to allow the person to view the personal effect as the person traverses the device. Another aspect of the present invention provides for the view port to extend along only a portion of a width of the sidewall.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawing, in which:

The FIGURE illustrates an isometric view of a walk-through security device incorporating an embodiment of a view port constructed in accordance with the present invention.

DETAILED DESCRIPTION

Figure 1:
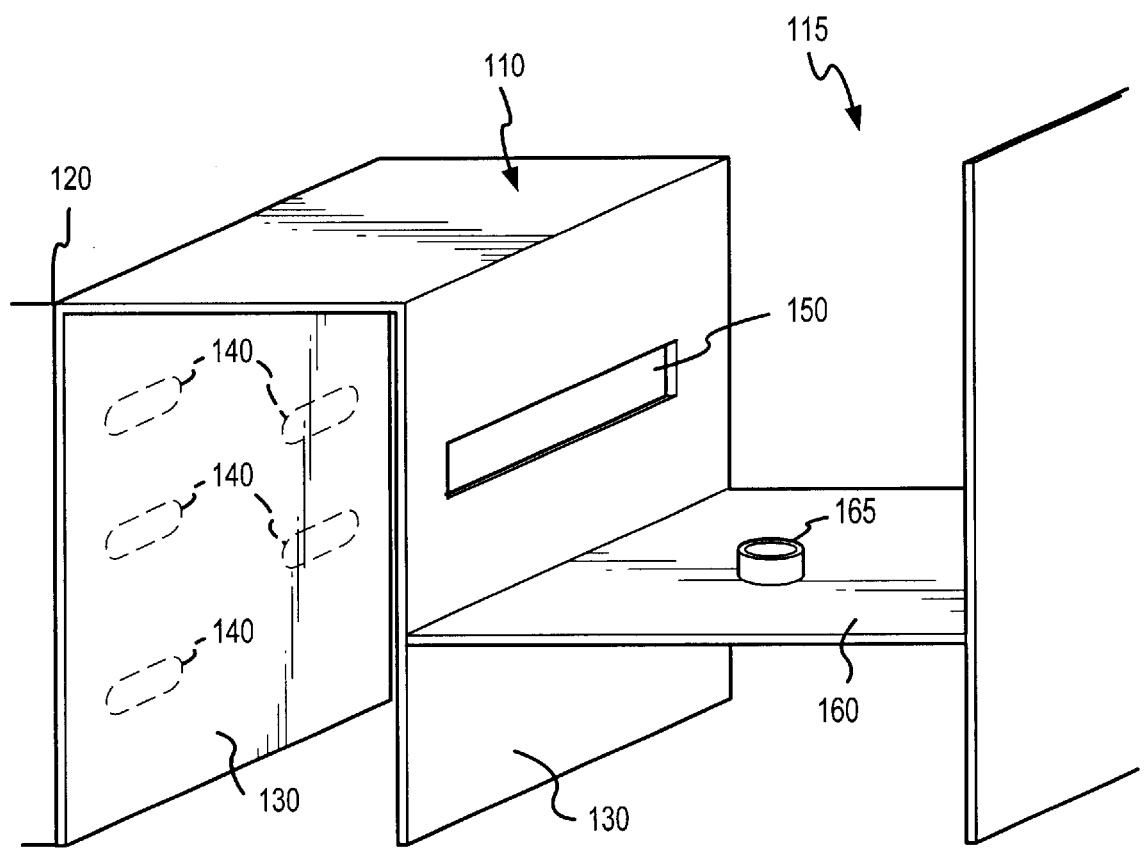

Referring to a FIGURE, illustrated is an isometric view of a walk-through security device 100 incorporating an embodiment of a view port 150 constructed in accordance with the present invention. The security device 100 is positioned to detect whether a person entering a secured area 115 is carrying prohibited materials.

The security device 100 is a shell 110 constructed around a frame 120 with opaque sidewalls 130. At least one material detector 140 is located in the shell 110 to detect a substance or material that may be carried by a person walking through the shell 110. In one embodiment of the invention the security device 100 is a metal detector and the material detector 140 detects metal. In most cases the security device 100 has a plurality of material detectors 140. Those skilled in the pertinent art will recognize that the majority of walk-through security devices 100 currently in use are used to detect metal but they can be used to detect other substances, such as the chemicals used in explosives.

A person entering a secured area 115 walks through the shell 110 so the material detectors 140 can detect whether he or she is carrying items prohibited in such area 115. If the person is carrying an item that may constitute a prohibited item, the detectors 140 will cause the device 100 to trigger a warning signal. In most cases the person going through the device 100 will know that large or massive metallic objects will trigger a warning signal, even though such objects are not prohibited within the secured area 115. They usually will place such items on a surface 160 adjacent to the device 100 prior to proceeding through the shell 110.

Metal detectors 140 are usually set to detect a mass of metallic material sufficient to constitute a weapon, such as a gun or knife. Developments in plastics and other materials have made firearms and other weapons possible that use minimal amounts of metal in their construction. In order to detect such weapons the sensitivity of detectors 140 on security devices 100 must be increased to a level where even small amounts of metal will trigger a warning signal. This means that people going through the device 100 may now have to remove valuable jewelry, such as gold chains and watches, before they can be cleared into a secured area 115. A valuable necklace or Rolex watch is something that even the most complacent and trusting person will be concerned about losing while transiting a walk-through security device 100.

After placing his or her personal effect on the counter 160 or in the basket 165, a person going through a prior art walk-through security device will not be able to keep his or her personal effects in view. Although the personal effects are typically out of the view for only a brief period of time, skilled thieves preying on unsuspecting victims at busy locations, such as airport gates, have ways of creating confusion and distractions whereby the object can be made to permanently "disappear." In some cases the parties monitoring the security device are participants in schemes to deprive rightful owners of valuable personal items.

In order to address such problems, the present invention advantageously provide a view port 150 on the otherwise opaque sidewall 130 that allows the person to keep his or her personal effects located on the opposite side of the sidewall 130 in view while passing through the shell 110 of the security device 100. The invention not only provides a sense of security to the person traversing the device 100 but also serves as a deterrent to would be thieves.

A viewport 150 could be as simple as an opening in the sidewall 130 and be within the intended scope of the present is invention. However, in order to preserve the integrity of the sidewalls 130, a particularly useful embodiment of the invention provides for a transparent material selected from the group consisting of glass and plastic to be used in the view port 150. Of course, the entire sidewall 130 could be made of a transparent material (and thus constitute a single large viewport 150) with metal detectors 140 mounted thereon and be within the intended scope of the present invention.

In another embodiment of the present invention, the personal effect is elevated to a given height so that the person going through the security device 100 can keep the personal effect in view because the view port 150 is located along a line of sight between the person and the personal effect. Such an embodiment is illustrated in FIG. 1. This embodiment assures the person going through the security device 100 that he or she will be able to monitor his or her personal effect at all times.

Another embodiment of the present invention can be beneficially employed with a security device 100 that requires the person walking through the device 100 to traverse a distance. This embodiment provides for the personal effect to be located on a conveyor belt (not illustrated) proximate the device 100. Another useful embodiment of the invention that can be advantageously employed, particularly with a security device 100 having a conveyor belt, is for the view port 150 to be horizontally elongated to allow the person to view the personal effect. Another aspect of the present invention provides for the view port 150 to extend along only a portion of a width of the sidewall, which embodiment is sufficient in most cases to permit the person traversing the security device 100 to keep his or her personal effect in view.

The invention includes several embodiments of methods of manufacturing and methods of operating walk-through security device having a personal effects view port. Sufficient detail has been set forth herein to enable one of ordinary skill in the pertinent art to understand and practice the various embodiments of such methods.

Although the present invention has been described in detail, those skilled in the art should understand that they can make various changes, substitutions and alterations herein without departing from the spirit and scope of the invention in its broadest form.

What is claimed is:

1. A walk-through security device, comprising:
    a shell having an opaque sidewall with at least one material detector located therein; and a view port, located on said opaque sidewall, that allows a person passing through said shell to view a personal effect located on an opposite side of said sidewall.

2. The device as recited in claim 1 wherein said view port comprises a piece of transparent material selected from the group consisting of:

glass, and plastic.

3. The device as recited in claim 1 wherein said device is a metal detector.

4. The device as recited in claim 1 wherein said personal effect is elevated to a given height and said view port is located along a line of sight between said person and said personal effect.

5. The device as recited in claim 1 wherein said personal effect is located on a conveyor belt proximate said device.

6. The device as recited in claim 1 wherein said view port is horizontally elongated to allow said person to view said personal effect as said person traverses said device.

7. The device as recited in claim 1 wherein said view port extends along only a portion of a width of said sidewall.

8. A method of operating a walk-through security device, comprising:

entering a shell having an opaque sidewall with at least one material detector located therein; and viewing through a view port a personal effect located on an opposite side of said sidewall while in said shell.

9. The method as recited in claim 8 wherein said view port comprises a piece of transparent material selected from the group consisting of:

glass, and plastic.

10. The method as recited in claim 8 wherein said device is a metal detector.

11. The method as recited in claim 8 wherein said personal effect is elevated to a given height and said view port is located along a line of sight between said person and said personal effect.

12. The method as recited in claim 8 wherein said personal effect is located on a conveyor belt proximate said device.

13. The method as recited in claim 8 wherein said view port is horizontally elongated to allow said person to view said personal effect as said person traverses said device.

14. The method as recited in claim 8 wherein said view port extends along only a portion of a width of said sidewall.

15. A method of manufacturing a walk-through security device, comprising:

forming a shell having an opaque sidewall;

placing at least one material detector in said sidewall; and providing a view port on said opaque sidewall, said view port allowing a person passing through said shell to view a personal effect located on an opposite side of said sidewall.

16. The method as recited in claim 15 wherein said view port comprises a piece of transparent material selected from the group consisting of:

glass, and plastic.

17. The method as recited in claim 15 wherein said device is a metal detector.

18. The method as recited in claim 15 wherein said personal effect is elevated to a given height and said providing comprises locating said view port along a line of sight between said person and said personal effect.

19. The method as recited in claim 15 wherein said view port is horizontally elongated to allow said person to view said personal effect as said person traverses said device.

20. The method as recited in claim 15 wherein said view port extends along only a portion of a width of said sidewall.

* * * * *